United States Patent
Chang et al.

(10) Patent No.: US 8,739,065 B2
(45) Date of Patent: May 27, 2014

(54) COMPUTING DEVICE, STORAGE MEDIUM AND METHOD FOR MANAGING SOFTWARE MENUS USING THE COMPUTING DEVICE

(75) Inventors: Chih-Kuang Chang, New Taipei (TW); Xin-Yuan Wu, Shenzhen (CN); Fei Wang, Shenzhen (CN); Heng Zhang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 122 days.

(21) Appl. No.: 13/433,200

(22) Filed: Mar. 28, 2012

(65) Prior Publication Data

US 2013/0036379 A1 Feb. 7, 2013

(30) Foreign Application Priority Data

Aug. 2, 2011 (CN) .......................... 2011 1 0219512

(51) Int. Cl.
G06F 3/048 (2013.01)
(52) U.S. Cl.
USPC ............ 715/810; 717/140; 717/143; 715/779
(58) Field of Classification Search
USPC .................................. 715/779, 810, 806, 764
See application file for complete search history.

(56) References Cited

U.S. PATENT DOCUMENTS 5,644,737 A * 7/1997 Tuniman et al. .............. 715/810
5,805,167 A * 9/1998 van Cruyningen ........... 715/808
2006/0200780 A1 * 9/2006 Iwema et al. ................. 715/810
2007/0234223 A1 * 10/2007 Leavitt et al. ................. 715/762
2012/0324377 A1 * 12/2012 Allington et al. ............. 715/763

OTHER PUBLICATIONS

Turner et al., Picture Yourself Building a Website with Joomla!® 1.6: Step-by-Step Instruction for Creating a High-Quality, Professional-Looking Site with Ease, Course Technology PTR, http://techbus.safaribooksonline.com/book/-/9781598638141, Jun. 27, 2011, pp. 3, 17, 69-71, 111, 115, 120-123, 209-217, and 243.*
Dixon, Doug, Adobe Encore DVD: In the Studio, O'Reilly Media, Inc., http://techbus.safaribooksonline.com/book/video/0596006004, Sep. 23, 2004, pp. 201-208.*

* cited by examiner

*Primary Examiner* — Kieu Vu
*Assistant Examiner* — Joy Weber
(74) *Attorney, Agent, or Firm* — Novak Druce Connolly Bove + Quigg LLP

(57) ABSTRACT

In a method for managing software menus using a computing device, a template file from a storage system is loaded. A name of an array, names of a plurality of software menus of the array, names of a plurality of buttons of the software menus and separators between the buttons, and parameters comprising an identifier (ID) and an image path of each of the buttons are obtained by parsing each line of instructions in the template file. A toolbar container for storing the obtained data having a predetermined memory frame is created. The software menus are established at a predetermined location in a preset window and the buttons of each of the software menus are added for each of the established software menus by reading data in the toolbar container. The window with the established software menus is displayed on a display screen.

18 Claims, 6 Drawing Sheets

COMPUTING DEVICE, STORAGE MEDIUM AND METHOD FOR MANAGING SOFTWARE MENUS USING THE COMPUTING DEVICE

BACKGROUND

1. Technical Field

The present disclosure relates to management systems and methods, and more particularly to a computing device, a storage medium and a method for managing software menus using the computing device.

2. Description of Related Art

Software menus are very important for application software in computing devices. If a user wants to find a tool from the software menus quickly, the user should be familiar with a toolbar of each of the software menus. The software menus of one application software are established when the application software is designed and created. Modifications of the software menus and the toolbars of the software menus must be done by special programmers, and users cannot establish or modify the software menus or the toolbars according to user preference. It is time-consuming and inefficient even when the special programmers are called out to establish different software menus and toolbars in different languages. Therefore, it is difficult for users to manage the software menus.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word module, as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable medium include CDs, DVDs, BLU-RAY, flash memory, and hard disk drives.

Figure 1:
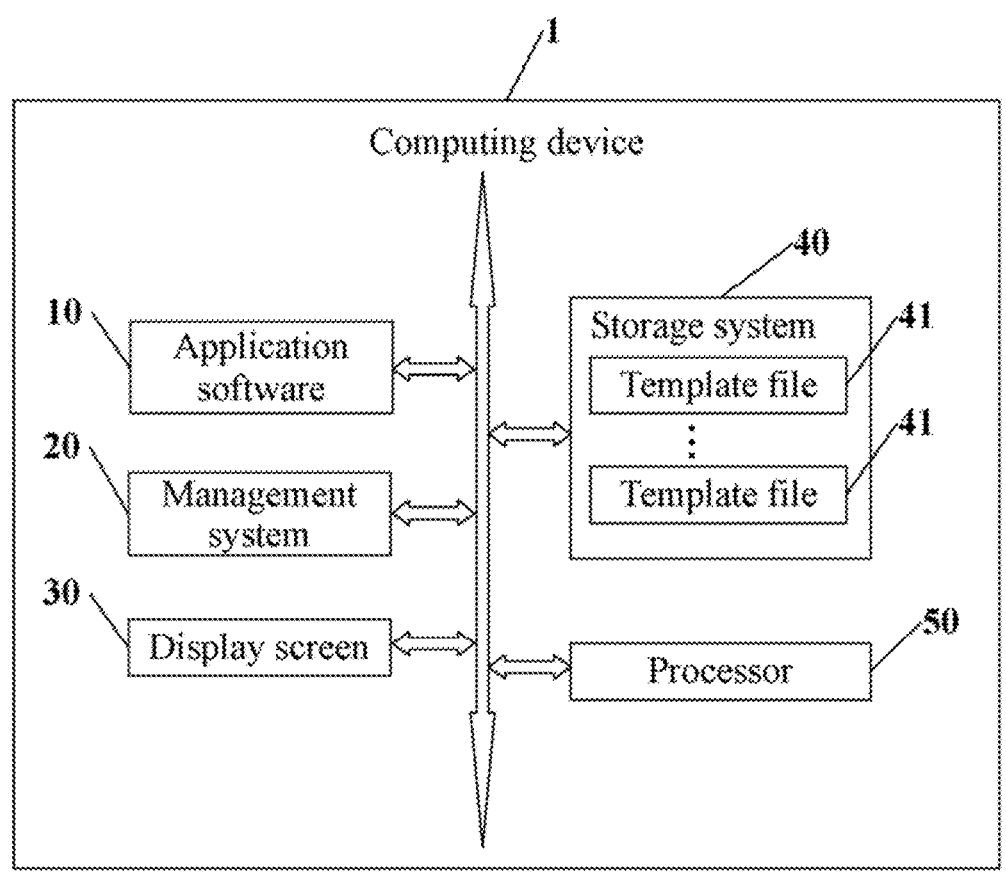
FIG. 1 is a block diagram of one embodiment of a computing device with a management system.

FIG. 1 is a block diagram of one embodiment of a computing device 1. The computing device 1 includes one or more computer programs (application software 10), a management system 20, a display screen 30, a storage system 40 and at least one processor 50. Each of the application software 10 provides at least one window as a user interface of the application software 10. The window may have a predetermined size, and may include command buttons, labels or other widgets for executing functions of the application software 10. The display screen 30 displays data of the computing device 1, such as images of the computing device 1.

Figure 2:
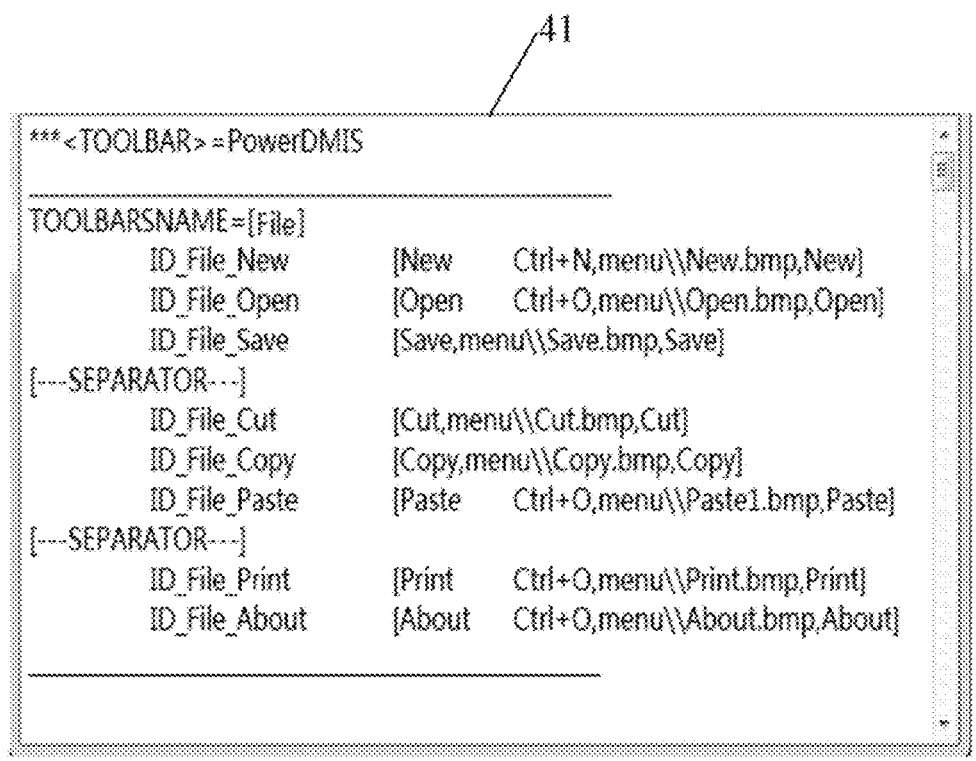
FIG. 2 is a schematic diagram of one embodiment of a template file.

The storage system 40 stores a plurality of template files 41. The template files 41 are files having a predefined format, and record data of software menus, and toolbars of the software menus in different languages. In one embodiment, FIG. 2 is a schematic diagram of a template file 41. Each of the template files 41 includes a plurality of lines of instructions (or codes) for recording data of the software menus and a toolbar of each of the software menus very clearly and allowing the recording of new data. Each of the template files 41 may be modified or managed according to user preferences. The at least one processor 50 executes one or more computerized codes and other applications of the computing device 1, for providing functions of the management system 20. The management system 20 processes data in the template files 41, and establishes and manages the software menus quickly and conveniently through the processed data in the template files 41. Details will be described as follows.

Figure 3:
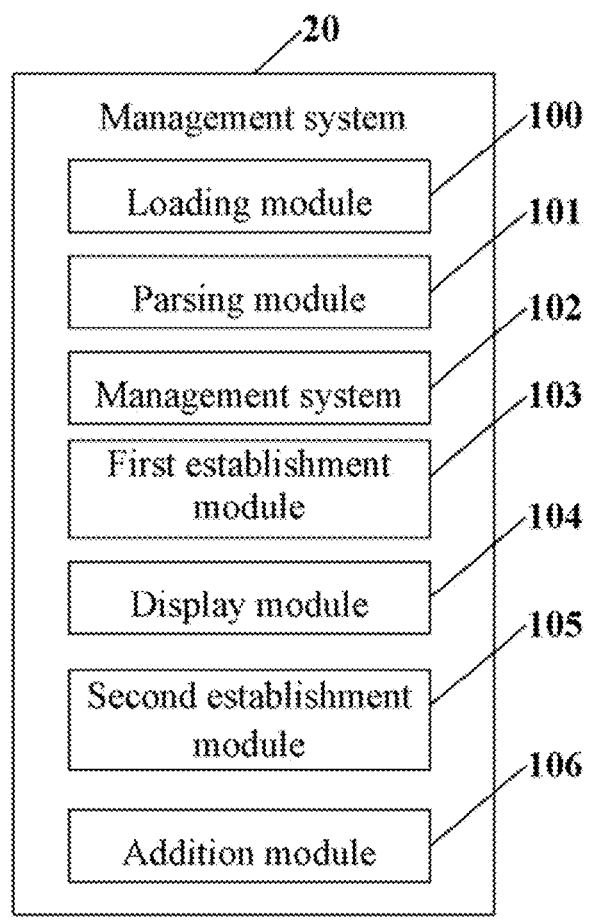
FIG. 3 is a block diagram of function modules of a management system included in the computing device of FIG. 1.

FIG. 3 is a block diagram of function modules of the management system 20 in the computing device of FIG. 1. In the embodiment, the management system 20 may include a loading module 100, a parsing module 101, a management module 102, a first establishment module 103, a display module 104, a second establishment module 105 and an addition module 106. The modules 100-106 comprise computerized codes in the form of one or more programs that are stored in the storage system 40. The computerized codes include instructions that are executed by the at least one processor 50 to provide functions for the modules. Details of each of the modules are given in FIG. 4 and FIG. 5.

Figure 4:
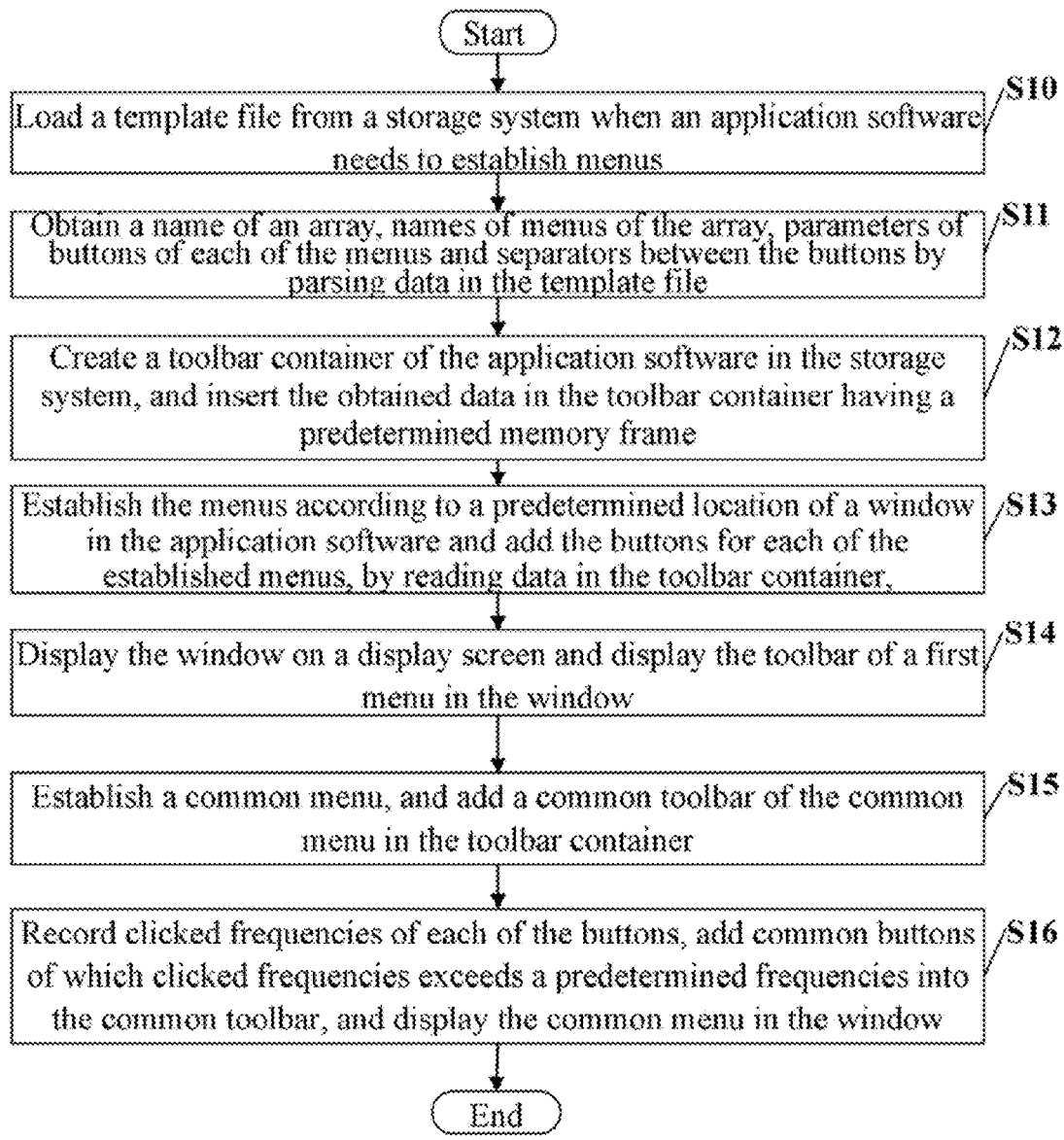
FIG. 4 is a flowchart of one embodiment of a method for managing software menus using the computing device of FIG. 1.

FIG. 4 is a flowchart of one embodiment of a method for managing software menus using the computing device 1 of FIG. 1. Depending on the embodiment, additional blocks may be added, others deleted, and the ordering of the blocks may be changed.

In block S10, the loading module 100 loads a template file 41 in a target language from the storage system 40 under the condition that the application software 10 needs to establish the software menus in the window of the application software 10. In one embodiment, the target language may be English or may be Chinese chosen according to user preferences. As mentioned above, the template file 41 includes a plurality of lines of instructions that records the data of the software menus.

In block S11, the parsing module 101 parses each of the lines of instructions in the template file 41, and obtains data in the template file 41 that may include, but is not limited to, a name of an array, names of a plurality of software menus of the array, parameters of a plurality of buttons of the software menus, and separators between the buttons. Buttons are types of graphical user interface elements that allows the user to choose only one of a predefined set of options in the software menus. According to FIG. 2, when reading a string of three asterisks ("*"), a name of an array "PowerDMIS" is obtained after a string of an equal symbol ("=") at a line of the "*" string. Each name of each of the software menus of the array is obtained in a string of an open-square-bracket and close-square-bracket ("[ ]") after the "=" string at a next line after each dividing line between the first "*" string and the next "*" string. The dividing lines are shown as long horizontal lines in FIG. 2. In FIG. 2, a name of a software menu of "File" is obtained, for example. After reading each name of the software menus before the next dividing line, the parsing module 101 obtains the parameters of each of the buttons and the separators between the buttons at each line of instructions between the line of the software menu name and the next dividing line. The parameters may include an identity (ID), a name, a shortcut key, an image path, and a command associated with each button, for example. As shown in FIG. 2 as an example, the parsing module 101 obtains the ID of one button being "File_New", the name of the button being "New", the shortcut key of the button being "Ctrl+N", the image path of the button being "software menu\\New.bmp", and the command of the button being "New".

In block S12, the management module 102 creates a toolbar container of the application software 10 in the storage system 40, and inserts the obtained data into the toolbar container according to a predetermined memory frame. The toolbar container is a data structure whose instances are collections of the obtained data, that is, the toolbar container stores the obtained data. The predetermined memory frame is a memory block that includes one or more array files named with the names of the arrays, software menu files named with the names of the software menus of each of the arrays in each array file, button files named with names of the buttons of each of the software menus and the separators between the buttons in each software menu file, and the parameters of each of the buttons in each button file. A predetermined memory frame allows more convenience in managing the data of the software menus, such as reading, amending the data, for example.

In block S13, the first establishment module 103 establishes the software menus at a predetermined location within the window of the application software 10, and adds the buttons of each of the software menus for each of the established software menus, by reading data in the toolbars container. Details of establishing the software menus are described in the FIG. 5.

Figure 6:
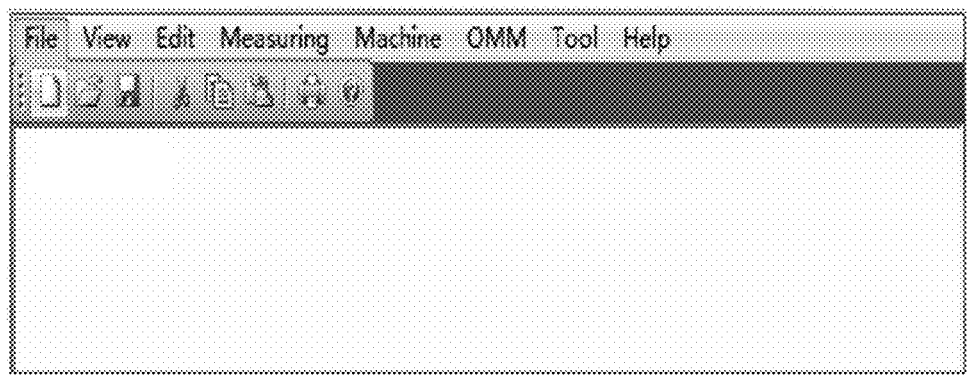
FIG. 6 is a schematic diagram of a graphic of newly-established software menus in one embodiment.

In block S14, the display module 104 displays the window of the application software 10 on the display screen 30, and displays the toolbar of a first software menu in the window. The window with the software menus and the toolbar of the first software menu are shown in FIG. 6. In one embodiment, if a mouse pointer (not shown in FIG. 1) of the computing device 1 moves towards one button, a predetermined pop-up or prompt message relating to the button may be displayed on the display screen 30. In one embodiment, the prompt message may be the name of the button. If the mouse pointer moves on one software menu, the toolbars of the software menu may be displayed on the display screen 30.

In block S15, the second establishment module 105 establishes a common software menu and adds a common toolbar of the common software menu in the toolbar container of the application software 10. The second establishment module 105 may add a software menu file named with common software menu in the array file. In one embodiment, the common software menu represents the software menu that includes commonly used or accessed buttons.

In block S16, the addition module 106 records how often each of the buttons is clicked, and adds common buttons into the common toolbar of the common software menu according to clicked frequencies of corresponding buttons, and displays the common software menu in the window on the display screen 30. The button is determined as a common button if the clicked frequencies of the button exceeds predetermined frequencies, such as 10 times, for example. In one embodiment, the common buttons in the common toolbar may be displayed in a descending order according to the clicked frequencies.

Figure 5:
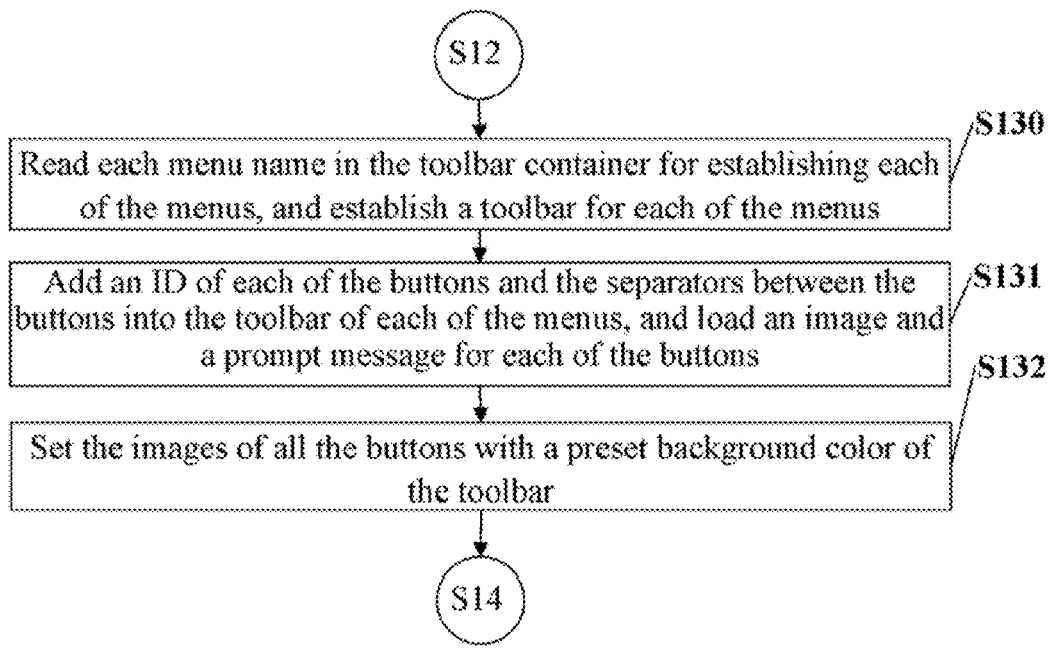
FIG. 5 is a flowchart of one embodiment of sub-steps of S13 in FIG. 4.

FIG. 5 is a flowchart of one embodiment of sub-steps of S13 in FIG. 4. In block S130, the first establishment module 103 establishes each of the software menus by reading each name of software menus, and adds a toolbar for each of the software menus. Each toolbar has a preset background color, a preset height, and a preset width. The preset height and the preset width may be adjusted according to a choice of different images of buttons added into each toolbar.

In block S131, the first establishment module 103 adds the ID of each of the buttons and the separators between the buttons into each toolbar, and loads the image and the predetermined pop-up or prompt message for each of the buttons, according to the parameters of each of the buttons and the separators between the buttons of each of the software menus in each software menu file.

In block S132, the first establishment module 103 sets the images of all the buttons with the preset background color of the toolbar.

All of the processes described above may be embodied in, and be fully automated via, functional code modules executed by one or more general-purpose processors. The code modules may be stored in any type of non-transitory readable medium or other storage device. Some or all of the methods may alternatively be embodied in specialized hardware. Depending on the embodiment, the non-transitory readable medium may be a hard disk drive, a compact disc, a digital video disc, a tape drive or other suitable storage medium.

The described embodiments are merely possible examples of implementations, and have been set forth for a clear understanding of the principles of the present disclosure. Many variations and modifications may be made without departing substantially from the spirit and principles of the present disclosure. All such modifications and variations are intended to be included herein within the scope of this disclosure and the described inventive embodiments, and the present disclosure is protected by the following claims.

What is claimed is:

1. A computing device, comprising:
   a storage system;
   at least one processor; and
   one or more programs that are stored in the storage system and executed by the at least one processor, the one or more programs comprising:
   a loading module that loads a template file having a target language from the storage system, the template file comprising data that records data of software menus of a determined software program;
   a parsing module that obtains a name of an array, names of a plurality of software menus of the array, and parameters of a plurality of buttons of the software menus and separators between the buttons, by parsing each of a plurality of lines of instructions in the template file, the parameters comprising a name, an identifier (ID) and an image path of each of the buttons, the plurality of lines of instructions in the template file is parsed by obtaining the name of the array after a string of an equal symbol ("=") at a line of a string of three asterisks ("*") when reading the "*" string, obtaining each name of each of the software menus of the array in a string of an open-square-bracket and close-square-bracket ("[ ]")after the "=" string at a next line after each dividing line between the first "*" string and the next "*" string, the dividing line being shown as a long horizontal line, and obtaining the parameters and the separators at each line of instructions between the line of the software menu name and the next dividing line;

a management module that creates a toolbar container in the storage system, and inserts the obtained data in the toolbar container having a predetermined memory frame;

a first establishment module that establishes the software menus at a predetermined location in a preset window and adds the buttons of each of the software menus for each of the established software menus, by reading the obtained data in the toolbar container; and a display module that displays the preset window with the established software menus on a display screen of the computing device.

2. The computing device as claimed in claim 1, wherein the predetermined memory frame comprises an array file named with the name of the array, software menu files named with the names of the software menus of the array in the array file, button files named with names of the buttons of each of the software menus and the separators between the buttons in each software menu file, and the parameters of each of the buttons in each button file.

3. The computing device as claimed in claim 2, wherein the first establishment module establishes the software menus by establishing each of the software menus according to reading the name of each of the software menus, and adding one toolbar for each of the software menus, each toolbar has a preset background color, a preset height, and a preset width;

adding the ID of each of the buttons and the separators between the buttons into each toolbar of each of the software menus, and loading an image for each of the buttons, according to the parameters of each of the buttons and the separators between the buttons of each of the software menus in each software menu file;

setting the images of all the buttons with the preset background color of the toolbar.

4. The computing device as claimed in claim 3, wherein the display module further displays the toolbar of a first software menu in the preset window.

5. The computing device as claimed in claim 1, wherein the one or more programs further comprise a second establishment module that establishes a common software menu and adds a common toolbar of the common software menu in the toolbar container;

an addition module that records clicked frequencies of each of the buttons, adds common buttons into the common toolbar of the common software menu, and displays the common software menu in the preset window on the display screen when the clicked frequencies of the common buttons exceed predetermined frequencies.

6. The computing device as claimed in claim 3, wherein the name of the button is displayed on the display screen in response that a mouse pointer of the computing device moves towards one button of one software menu, and the toolbar of the one software menu is displayed on the display screen if the mouse pointer moves on the one software menu.

7. A computer-implemented method for managing software menus using a computing device, the method comprising:

loading a template file in a target language from a storage system of the computing device, the template file comprising a plurality of lines of instructions for recording data of the software menus;

obtaining a name of an array, names of a plurality of software menus of the array, names of a plurality of buttons of the software menus and separators between the buttons, and parameters of a plurality of buttons of the software menus and separators between the buttons, by parsing each of the plurality of lines of instructions in the template file, the parameters comprising a name, an identifier (ID) and an image path of each of the buttons, the plurality of lines of instructions in the template file is parsed by obtaining the name of the array after a string of an equal symbol ("=") at a line of a string of three asterisks ("*") when reading the "*" string, obtaining each name of each of the software menus of the array in a string of an open-square-bracket and close-square-bracket ("[ ]") after the "=" string at a next line after each dividing line between the first "*" string and the next "*" string, the dividing line being shown as a long horizontal line, and obtaining the parameters and the separators at each line of instructions between the line of the software menu name and the next dividing line;

creating a toolbar container in the storage system, and inserting the obtained data in the toolbar container having a predetermined memory frame;

establishing the software menus at a predetermined location in a preset window and further adding the buttons of each of the software menus for each of the established software menus, by reading the obtained data in the toolbar container;

displaying the preset window with the established software menus on a display screen of the computing device.

8. The method as claimed in claim 7, wherein the predetermined memory frame comprises an array file named with the name of the array, software menu files named with the names of the software menus of the array in the array file, button files named with names of the buttons of each of the software menus and the separators between the buttons in each software menu file, and the parameters of each of the buttons in each button file.

9. The method as claimed in claim 8, wherein the software menus are further established by establishing each of the software menus according to reading the name of each of the software menus, and adding one toolbar for each of the software menus, each toolbar has a preset background color, a preset height, and a preset width;

adding the ID of each of the buttons and the separators between the buttons into each toolbar, and loading an image for each of the buttons, according to the parameters of each of the buttons and the separators between the buttons of each of the software menus in each software menu file;

setting the images of all the buttons with the preset background color of the toolbar.

10. The method as claimed in claim 9, further comprising: displaying the toolbar of a first software menu in the preset window.

11. The method as claimed in claim 7, further comprising: establishing a common software menu and adding a common toolbar of the common software menu in the toolbar container;

recording clicked frequencies of each of the buttons, adding common buttons into the common toolbar of the common software menu, and displaying the common software menu in the preset window on the display screen when the clicked frequencies of the common buttons exceed predetermined frequencies.

12. The method as claimed in claim 9, wherein the name of the button is displayed on the display screen in response that a mouse pointer of the computing device moves towards one button of one software menu, and the toolbar of the one software menu is displayed on the display screen if the mouse pointer moves on the one software menu.

13. A non-transitory computer readable storage medium storing a set of instructions, when executed by at least one processor of a computing device, cause the at least one processor to perform a method for managing software menus using the computing device, the method comprising:

loading a template file in a target language from a storage system of the computing device, the template file comprising a plurality of lines of instructions for recording data of the software menus;

obtaining a name of an array, names of a plurality of software menus of the array, names of a plurality of buttons of the software menus and separators between the buttons, and parameters of a plurality of buttons of the software menus and separators between the buttons, by parsing each of the plurality of lines of instructions in the template file, the parameters comprising a name, an identifier (ID) and an image path of each of the buttons, the plurality of lines of instructions in the template file is parsed by obtaining the name of the array after a string of an equal symbol ("=") at a line of a string of three asterisks ("*") when reading the "*" string, obtaining each name of each of the software menus of the array in a string of an open-square-bracket and close-square-bracket ("[ ]") after the "=" string at a next line after each dividing line between the first "*" string and the next "*" string, the dividing line being shown as a long horizontal line, and obtaining the parameters and the separators at each line of instructions between the line of the software menu name and the next dividing line;

creating a toolbar container in the storage medium, and inserting the parsed data in the toolbar container having a predetermined memory frame;

establishing the software menus at a predetermined location in a preset window and adding the buttons of each of the software menus for each of the established software menus, by reading the obtained data in the toolbar container;

displaying the preset window with the established software menus on a display screen of the computing device.

14. The non-transitory computer readable storage medium as claimed in claim 13, wherein the predetermined memory frame comprises an array file named with the name of the array, software menu files named with the names of the software menus of the array in the array file, button files named with names of the buttons of each of the software menus and the separators between the buttons in each software menu file, and the parameters of each of the buttons in each button file.

15. The non-transitory computer readable storage medium as claimed in claim 14, wherein the software menus are further established by establishing each of the software menus according to reading the name of each of the software menus, and adding one toolbar for each of the software menus, each toolbar has a preset background color, a preset height, and a preset width;

adding the ID of each of the buttons and the separators between the buttons into each toolbar, and loading an image for each of the buttons, according to the parameters of each of the buttons and the separators between the buttons of each of the software menus in each software menu file;

setting the images of all the buttons with the preset background color of the toolbar.

16. The non-transitory computer readable storage medium as claimed in claim 15, further comprising:

displaying the toolbar of a first software menu in the preset window.

17. The non-transitory computer readable storage medium as claimed in claim 13, further comprising establishing a common software menu and adding a common toolbar of the common software menu in the toolbar container;

recording clicked frequencies of each of the buttons, adding common buttons into the common toolbar of the common software menu, and displaying the common software menu in the preset window on the display screen when the clicked frequencies of the common buttons exceed predetermined frequencies.

18. The non-transitory computer readable storage medium as claimed in claim 15, wherein the name of the button is displayed on the display screen in response that a mouse pointer of the computing device moves towards one button of one software menu, and the toolbar of the one software menu is displayed on the display screen if the mouse pointer moves on the one software menu.

* * * * *